UNITED STATES PATENT OFFICE.

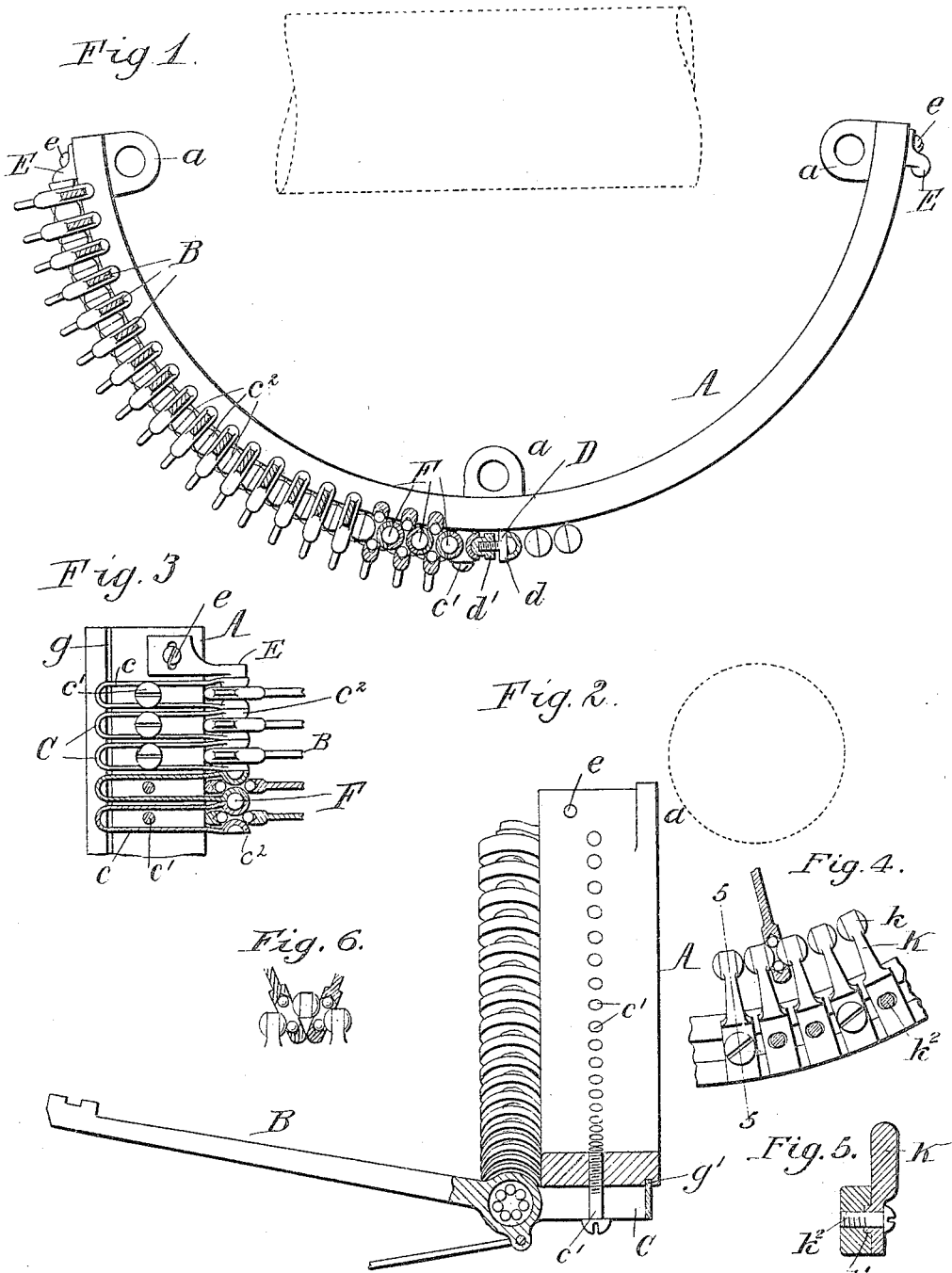

EMMIT G. LATTA, OF FRIENDSHIP, NEW YORK, ASSIGNOR OF ONE-HALF TO HARVEY A. MOYER, OF SYRACUSE, NEW YORK.

TYPE-WRITING MACHINE.

No. 821,107.     Specification of Letters Patent.     Patented May 22, 1906.

Application filed September 8, 1902. Serial No. 122,476.

*To all whom it may concern:*

Be it known that I, EMMIT G. LATTA, a citizen of the United States, and a resident of Friendship, in the county of Allegany and State of New York, have invented new and useful Improvements in Type-Writing Machines, of which the following is a specification.

This invention relates to improvements in type-writing machines, and more particularly to antifriction-bearings for the swinging type-bars.

The object of the invention is to produce a self-centering bearing of simple inexpensive construction in which an untrue or inaccurate alinement or relative adjustment of the bearing-surfaces for the type-bars will not prevent a free movement of the type-bars and will not cause a binding or strain on the bearing.

Another object is the provision of means for quickly and easily adjusting the bearings to take up wear or for other reasons, which will have the minimum tendency to disturb the correct relative position of the parts of the bearings, and will enable ample adjustment to correct the bearings and take up the wear after long usage.

The object of the invention is accomplished principally in the provision of opposable spherical bearing-surfaces for the antifriction bearing-balls for the type-bars and means which acts in the axial line of the bearings for adjusting them toward each other.

In the accompanying drawings, consisting of two sheets, Figure 1 is a front elevation of the type-bar segment of a type-writing machine provided with bearings embodying the invention, a portion only of the bars and bearings being shown, part in section and part in elevation, with the outer ends of the type-bars broken away. Fig. 2 is a transverse sectional elevation thereof. Fig. 3 is a fragmentary end view thereof, showing the hangers in elevation and section. Fig. 4 is a fragmentary elevation, partly in section, of a segment and hangers of a slightly different form. Fig. 5 is a section in line 5 5, Fig. 4. Fig. 6 is a sectional elevation of adjacent hangers and type-bars, illustrating the manner of removing a hanger.

In the drawings the invention is shown as applied to a front-strike type-writer; but the improvements are also applicable to a machine in which the printing-point is either above or below the platen. Any number of type-bars can be employed, and they can be arranged in more than one row where a large number of bars are employed.

Like letters of reference refer to like parts in the several figures.

Referring particularly to Figs. 1, 2, and 3, A represents the type-bar support or segment, which is curved concentric with the printing-point and is secured on the typewriter frame (not shown) by suitable means, such as bolts passing through lugs $a$ at the ends and center of the segment. B represents the type-bars, and C the bearing-hangers for the type-bars. Each hanger has a substantially U-shaped securing portion or shank $c$, which is secured to the segment by a screw $c'$, passing through the loop formed by the separated legs of the shank, with its head bearing on the outer edges of the legs. The shank of the screw is of less diameter than the width of the space between the legs of the shank to permit the hanger to be adjusted laterally of itself or lengthwise of the segment, as hereinafter described. Each hanger is also provided with opposable bearing-surfaces $c^2$ at the front ends of the legs of the shank. Each type-bar is provided at its inner end with a circular enlargement, which is arranged between the two bearing-surfaces of the hanger and is provided with an internal V-shaped groove, having a circular row of balls, which bear on the opposable bearing-surfaces of the hanger. The bearing-surfaces of the hanger are preferably hemispherical in form, and the legs of the hanger are capable of springing apart sufficiently to enable the bearing end of the type-bar to be sprung into place between the bearing-surfaces of the hanger, which bearing-surfaces spring together and bear against the balls in the type-bar. The hangers are preferably arranged, as shown, side by side on the outer convexed periphery of the segment in two groups on opposite sides of a stop or abutment D at the center of the segment. The hangers are provided on the outer sides of their bearing ends with hemispherical sockets. The sockets of the adjacent hangers form seats for retaining-balls F, which transmit or resist the movement of the hangers in adjusting the bearings. The end abutments E are adjustably mounted on the segment in any suitable manner—for instance, by screws *e*, passing through elongated slots in the abutments—and each abutment is provided with a hemispherical projection, which seats in the outer socket of the adjacent hanger. To adjust the hangers, the securing-screws therefor and the holding-screws of the end abutments are loosened and the latter moved toward the center stop, so as to crowd or press the hangers together. The movement is transmitted from one hanger to the next by the retaining-balls F. After the proper adjustment is secured the abutments and hangers are firmly secured in position by tightening their holding-screws. The center stop also is preferably designed to spread the hangers apart at the center of the segment or force the hangers in opposite directions toward the end abutments in order to take up the wear or play when it occurs in a bearing or bearings near the center, so as not to disturb all of the bearings. The center stop (shown in Fig. 1) consists of a bolt *d*, having a hemispherical head seated in the socket of the adjacent hanger, and a nut *d'*, which is screwed on said bolt and provided with a hemispherical head which engages in the inner socket of the adjacent hanger. The nut is provided with an angular portion adapted to be engaged by a wrench or tool to turn the nut, and the bolt is provided with a flat-faced projection which engages the segment to hold the bolt from turning. By turning the nut the hangers are forced from the center toward the end stops. This adjustable center stop is desirable also to supplement the adjustment by the end stops when the wear in the bearings is considerable, for the movement of the several hangers is limited by the width of their shanks, and if the necessary movement in one group of hangers is greater than the movement of which one hanger is capable a proper adjustment could not be effected by the end stops only. To prevent the hangers from twisting on their securing-screws or moving transversely on the segment, the latter is provided in its outer face with a groove *g*, in which engage lugs or projections *g'* on the rear ends of the hangers. It is not necessary to detach or disturb all of the hangers to effect the removal of a particular one; but this can be accomplished by loosening one of the end stops or the center stop and the securing-screws for the hammers between such stop and the hanger to be removed and shifting the loosened hangers laterally. Sufficient space can thus be secured to effect the removal of the desired hanger.

It is a matter of considerable difficulty and expense to make the bearing-surfaces for the small type-bar ball-bearings where they are of cone form and properly adjust them so that the axes of both cones are exactly coincident with the axial line of the bearing or to preserve this exact relative position of the cones during long usage and repeated adjustments, and if the exact position of the cones is not maintained they will pinch or bind the balls at one side. By the use of the hemispherical instead of conical bearing-surfaces on the hangers the bearing-surfaces are self-centering and the balls seat themselves perfectly on whichever portions of the surfaces come in contact with them and work just as freely if one or both of the bearing-surfaces is out of true position as they would with both bearing-surfaces exactly centered on the axial line of the bearing. The plane of the circular row of balls is changed slightly with a change in the relative position of the two bearing-surfaces; but the bearing-surfaces will not bind or pinch the balls at one side, as would be the case with bearing-cones, unless the latter were exactly alined. The movement of the type and of the type-bar out of its correct printing position by an inaccuracy in the bearing can be readily corrected by slightly bending or deflecting the type-bar. As stated, the bearing-surfaces described are self-centering, and as the adjusting devices exert their pressure on the hangers in the axial line of the bearings there is little or no tendency to disturb the proper relative position of the bearing-surfaces. The construction described is simple and inexpensive, for the hangers can be made by stamping or pressing from sheet metal, and separate adjusting devices for the several bearings is not necessary. The hollow hemispherical or cup-shape bearing ends of the hangers are easily made of uniform hardness throughout by case-hardening, which could not be readily done if the bearing ends were of solid section. For such reasons this construction is a desirable one. The advantageous features of the invention, however, can be secured by other forms of hangers—such, for instance, as shown in Figs. 4 and 5 of the drawings.

It is obvious that the hangers may be in the form of posts having spherical heads and also that it is not necessary for the heads or bearing-surfaces to be complete spheres or hemispheres so long as those portions of the bearing-surfaces on which the balls run or are liable to run after adjustments of the hangers are spherically curved or are portions of spheres. Thus in the construction shown in Figs. 4 and 5 the hangers K have heads *k*, the sides of which are of spherical curvature, while the central portion connecting the heads are made cylindrical to permit the edges of the ball-races in the type-bars to fit closely around them to make the bearings as nearly dust-proof as possible. In the construction shown in these figures the hangers project radially from the segment toward the printing-point. They are held on the segment by angular lugs *k'* on the hangers engaging in a groove in the segment and screws $k^2$, which pass through elongated slots in the shanks of the hangers. The bearings are adjusted by end and center abutments bearing against the heads of the hangers in the manner described in connection with the other construction shown. Any one of the hangers shown in Figs. 4 and 5 can be detached without disturbing the others by removing its securing-screw and lifting the hanger. The two type-bars supported by the hanger will rock on the bearing-surfaces of the adjacent hangers to permit such movement of the hanger which is being removed.

Numerous other forms of the hangers and type-bars producing the desired results to a greater or less degree of perfection could be illustrated and specifically described herein; but it is not believed necessary to a proper understanding of the invention.

I claim as my invention—

1. The combination in a type-writing machine, of a series of vibrating type-bars, a series of hangers providing substantially spherical bearing-heads for said type-bars each of which heads extends between and partially supports two adjacent type-bars, and a circular row of balls carried by each type-bar and bearing on said bearing-heads, substantially as set forth.

2. The combination in a type-writing machine, of a series of vibrating type-bars, a series of hangers providing substantially spherical bearing-heads for the type-bars each of which heads is formed by two adjacent hangers and extends between and partially supports two adjacent type-bars, and a circular row of balls carried by each type-bar and bearing on said bearing-heads, substantially as set forth.

3. The combination in a type-writing machine, of a series of vibrating type-bars, a series of hangers providing bearing-heads each of which extends between and partially supports the bearing ends of two adjacent type-bars, and a circular row of bearing-balls carried by one of said bearing parts and bearing on an integral bearing-face on the other bearing part, substantially as set forth.

4. The combination in a writing-machine having a series of vibrating type-bars, and hangers therefor arranged in a segment and laterally adjustable, of means for adjusting the hangers from the central part of the segment toward its ends, substantially as set forth.

5. The combination in a writing-machine having a series of vibrating type-bars, a supporting-segment, and type-bar hangers arranged side by side on said segment and laterally adjustable thereon, of means for adjusting the hangers from the central part of the segment outwardly, and from its ends inwardly, substantially as set forth.

6. The combination in a writing-machine of a series of vibrating type-bars each containing a row of bearing-balls, a segment, a series of hangers supported by and independently secured to said segment and having opposable laterally-adjustable bearing-surfaces for the bearing-balls, each hanger being adapted to be detached from the segment without removing its neighbor, and means for adjusting the bearings by moving the hangers along the segment, substantially as set forth.

7. The combination in a writing-machine having a series of vibrating type-bars, of a series of U-shaped hangers supporting the bars in a segment at their free ends, and having their adjoining ends connected, with means for closing the ends of the hangers by crowding them into closer contact, substantially as set forth.

8. The combination in a writing-machine having a series of vibrating type-bars, of a series of U-shaped hangers supporting the bars at their free ends, and having said ends in contact, with means for closing the ends of the hangers by crowding them together, substantially as set forth.

9. In a type-writing machine, the combination of a series of vibrating type-bars, each containing a circular row of bearing-balls, and a series of U-shaped hangers each formed of a single piece of sheet metal and having a pair of opposable center bearings and adapted to be sprung into operative position with the balls, substantially as set forth.

10. In a type-writing machine, the combination of a series of vibrating type-bars, each containing a circular row of bearing-balls, and a series of hangers, each having a pair of opposable center bearings for the balls, and each hanger in direct contact with the neighboring hanger whereby the bearings are held against lateral movement, substantially as set forth.

11. In a type-writing machine, the combination of a series of vibrating type-bars, each containing a circular row of bearing-balls, and a series of hangers each having hollow or cup-shape bearings for the balls, and a connecting-ball arranged in the hollow parts of adjoining hangers, substantially as set forth.

Witness my hand this 26th day of August, 1902.

EMMIT G. LATTA.

Witnesses:
E. A. HEWITT,
W. A. STEVENS.